(12) United States Patent
Maas

(10) Patent No.: US 7,779,576 B2
(45) Date of Patent: Aug. 24, 2010

(54) BURROWING PEST EXTERMINATION DEVICE

(76) Inventor: Frank J. Maas, P.O. Box 126, Midvale, ID (US) 83645

( * ) Notice: Subject to any disclaimer, the term of this patent is extended or adjusted under 35 U.S.C. 154(b) by 22 days.

(21) Appl. No.: 11/565,298

(22) Filed: Nov. 30, 2006

(65) Prior Publication Data

US 2008/0127547 A1 Jun. 5, 2008

(51) Int. Cl.
*A01M 1/24* (2006.01)
(52) U.S. Cl. .............................. 43/124; 43/127; 43/144
(58) Field of Classification Search .................. None
See application file for complete search history.

(56) References Cited

U.S. PATENT DOCUMENTS

| | | | |
|---|---|---|---|
| 4,005,976 A * | 2/1977 | Rombach et al. .............. 431/13 |
| 4,539,774 A | 9/1985 | Hamilton | |
| 4,640,043 A | 2/1987 | Sigler | |
| 5,860,243 A * | 1/1999 | Stager .......................... 43/124 |
| 6,171,098 B1 * | 1/2001 | Meyer et al. .................. 431/72 |
| 6,257,875 B1 * | 7/2001 | Johnstone et al. ........... 431/345 |
| 6,581,324 B1 | 6/2003 | Creeger et al. | |
| 2005/0144832 A1 * | 7/2005 | Shaffer ........................ 43/124 |
| 2006/0230671 A1 * | 10/2006 | Hudson et al. ................ 43/124 |
| 2008/0127547 A1 * | 6/2008 | Maas .......................... 43/124 |

* cited by examiner

*Primary Examiner*—Christopher P Ellis
(74) *Attorney, Agent, or Firm*—Robert L. Shaver; Dykas, Shaver & Nipper, LLP

(57) ABSTRACT

The invention is BURROWING PEST CONTROL DEVICE, while mixing together oxygen and a flammable gas and injecting it into an underground burrow. The device includes the feature of being operated from a remote position, a vortex injection of the gases, and a device for generating a shockwave to propagate combustion throughout the stream of mixed gases.

26 Claims, 2 Drawing Sheets

BURROWING PEST EXTERMINATION DEVICE

FIELD OF THE INVENTION

The present invention generally relates to an apparatus for burrowing pest control, and more particularly to an apparatus for injecting flammable gas and oxygen into underground pest burrows for combustion and extermination of burrowing pests.

BACKGROUND OF THE INVENTION

Burrowing pests have been a problem for gardeners, ranchers, and farmers since time in immemorial. There have been many devices for the specific purpose of combating burrowing pests in their underground burrows including spring traps, jaw traps, spring spears, steel traps, poisons, and explosive devices. Eradicating burrowing pests is made more difficult because the pest burrow may be quite long with various entry points, underground chambers, and various escape routes. Poisonous gases have been utilized but this is dangerous to the operator and may involve such environmental impact as to make it impractical.

Explosive gases have also been injected into the system of burrows of burrowing animals. The use of explosive gases can be effective, but faces certain challenges. An applicator for injecting flammable gases into an underground burrow must cause the gas to penetrate deeply into the system of burrows for it to be effective. Usually, the flammable gas is a mixture of oxygen and a flammable gas and, at a certain distance from the injection point, the two gases can separate and the effectiveness of the combustion may become greatly reduced. Such a device also has to be very safe for the applicator so that there is no possibility of combustion around the applicator or of carrying the combustion into the device itself.

SUMMARY OF THE INVENTION

The present invention is a burrowing pest control device based on injecting a mixture of oxygen and a flammable gas into underground borrows. The device includes a valve assembly, a combustion assembly, an ignition assembly, an injector assembly, and a control panel assembly. The burrowing pest control device works by mixing oxygen and a flammable gas and injecting that mixture of gases into the hole of the burrowing pest, so that the mixture of gases penetrates some distance into the hole. At a selected time, the mixture of oxygen and flammable gas is ignited by the ignition assembly and the mixture combusts underground, thus eliminating the burrowing pest in the underground burrow.

The valve assembly includes a hose connection for an oxygen hose from a source of compressed oxygen. It also includes a hose connection for a hose supplying flammable gas from a flammable gas source. The flammable gas and the oxygen are connected from exterior sources to provide the burrowing pest control device with both of these gases. The valve assembly also includes an oxygen valve, which is configured to open and close a pathway for oxygen into the device of the invention. The flammable gas valve is also configured to open and close a pathway for flammable gas into the device. The functions of both of these valves can be combined into one valve, which controls the flow of both gases. The valve assembly also includes a valve controller which controls the oxygen valve and may also control the flammable gas valve. The oxygen and gas can be controlled by two separate valve controllers.

The combustion assembly includes a combustion chamber in which combustion of the mixture of oxygen and flammable gas is initiated. The device also includes an ignition assembly which includes a spark plug, a device for generating and sending energy for the spark to the spark plug, an ignition switch, and a radio receiver for receiving a signal from a remote location to initiate a spark. The ignition assembly includes a transmitter for remote detonation of the gases.

The device also includes an injection assembly, which includes an injection tube, which is adjacent to the combustion chamber, which directs the mixture of gases into an underground burrow.

The device also includes a control panel assembly, which includes a control panel and a remote transmitter, with the remote transmitter configured for remote operation of the device. In one configuration of the device the remote transmitter is able to control one or more valves, which allows oxygen and flammable gas to flow into the combustion chamber, as well as to control the initiation of the spark in the ignition assembly from a remote location.

The device can include a mixing tip, which creates a thorough mixing of the oxygen and flammable gas. The device can also include a nozzle tip in the injection tube, which contains a narrowing internal diameter followed by a gradually expanding internal diameter. This constricting flare in the passageway through which the mixture of gases flows is designed to impart a shockwave to the gas and oxygen as the gases are ignited. In one configuration of the mixing tip, the flow of oxygen can serve as an eductor to draw the appropriate flow of flammable gas into the oxygen stream, which contributes to thorough mixing. The mixing tip can further include a turbo tip, which is configured to impart a vortex, or a spiraling flow, to the mixture of gases as they enter the combustion chamber. When the gases pass from the combustion chamber they pass through a nozzle tip which has reduced diameter and directional vanes to further impart vortex flow to the mixture of gases.

In one configuration of the device, the valve assembly is contained in a valve housing with the combustion ignition and injector assemblies located in a device tip. In this configuration, the valve housing and the device tip are connected by conduits which contain a line for flammable gas, a line for oxygen, and a line which contains the electronics line to the ignition assembly. In this configuration, the valve housing is held in a spaced apart relation from the device tip and the two are joined by extended lines containing flammable gas conduit, oxygen conduit, and electronics line.

The device can also include a thermal switch in the combustion chamber for the purpose of cutting off the flow of gases when the temperature of the combustion chamber exceeds a pre-selected temperature. The device can further include a check valve in the combustion assembly for the purpose of preventing the gases in the combustion chamber from being ignited and from burning material coming from outside of the device itself. This can occur when gas has been injected and ignited into a section of burrow, and flammable material in the burrow is still being burned. Then, when gas begins to be injected into another opening into the same burrow system, it is possible for the gas to be ignited by the burning material in the burrow rather than from the spark plug. In that case, the flow of new gas would be cut off by the check valve or the thermal switch.

The panel assembly can further include a status board on which various parameters of the device can be displayed. This includes information about the status of the gas and oxygen valve, power to the unit, and the battery.

One embodiment of the device includes a configuration in which the oxygen and the flammable gas are not mixed together until the combustion chamber, which is adjacent to the nozzle tip.

One embodiment of the device includes structure such as a mixture tip and a turbo tip to induce a vortex flow into the device, coupled with a constriction in the exit line, which creates a shockwave of combustion in the mixture of gases.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
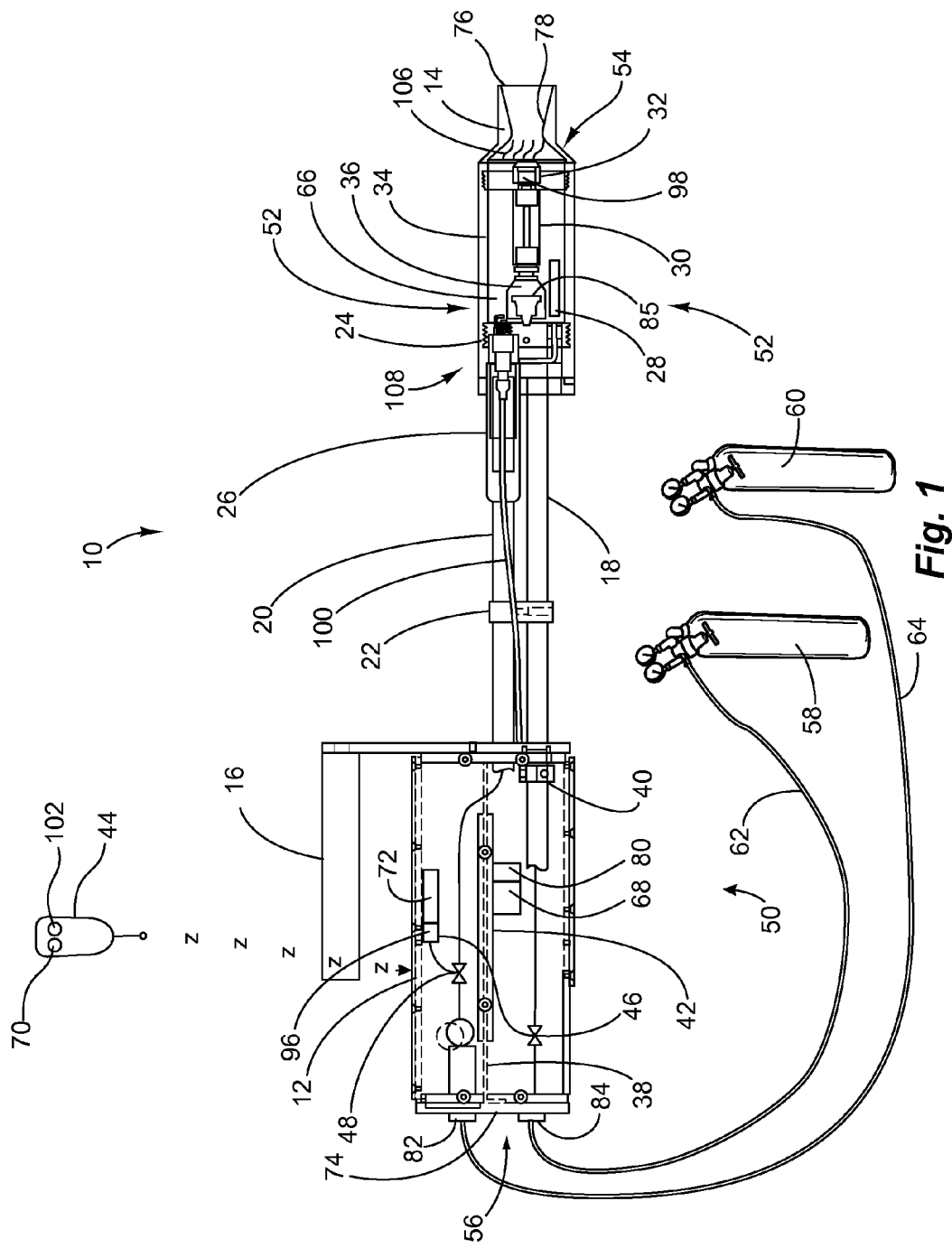
FIG. 1 is a cross sectional view of the device of the invention.

While the invention is susceptible of various modifications and alternative constructions, certain illustrated embodiments thereof have been shown in the drawings and will be described below in detail. It should be understood, however, that there is intention to limit the invention to the specific form disclosed, but, on the contrary, the invention is to cover all modifications, alternative constructions, and equivalents falling within the spirit and scope of the invention as defined in the claims.

The preferred embodiment of the invention is shown in the figures. FIG. 1 shows the burrowing pest control device 10 of the invention which includes a valve housing 12, a device tip 14, a handle 16 for carrying the device. The device is generally divided into a valve assembly 50 which is located within the valve housing 12. Another division is the combustion assembly 52 which is located within the device tip 14. The injector assembly 54 is also located in the device tip 14 and includes an injection tube 34 and a nozzle tip 76. In this embodiment of the invention, device tip 14 is held in a spaced apart relationship from the valve housing 12, and the two are connected by pipes. An oxygen pipe 18 transfers oxygen from the valve housing 12 into the metering and mixing region of the device tip 14. A flammable gas pipe 20 conducts a flammable gas from the valve housing 12 to the metering and mixing region of the device tip 14. A third pipe may also be present which houses wires and other electrical components for sending a signal from the valve housing 12 to the device tip 14.

The valve housing 12 is preferably made of metal, but other materials can be utilized such as a suitable plastic, fiberglass or other material. The gas lines 18 and 20 are preferably made of metal pipe and may be approximately 24 inches long and ½ inch in diameter.

FIG. 1 shows a pipe clamp 22 and a pipe seal 40 which are devices utilized with the gas pipes 18 and 20. The combustion assembly is shown as 52 and is located in the device tip 14. The combustion assembly 52 includes a combustion chamber 66 and an oxygen conduit or pipe 18 and a flammable gas conduit or pipe 20. An ignition assembly includes a spark generator 68 and a spark plug 24, an ignition switch 70, a valve controller 96, and a radio receiver 72. The spark plug 24 is preferably housed in a spark plug sleeve 26. The spark plug 24 is electrically connected to the spark generator 68 by an electronics line 100, and to an ignition switch 70, as well as ignition control mechanisms in the valve housing 12, which may be activated from the control panel 74 or from the remote transmitter 44. A factory-set timed activation switch may also be added. A preferred design of the mixing tip 36 is one in which the flow of oxygen can serve as an eductor 85, to draw the appropriate flow of flammable gas into the oxygen stream, which contributes to thorough mixing.

Located in the device tip 14 is also a thermal switch 28, and a check valve 30. The thermal switch 28 detects the temperature in the combustion chamber 66 and shuts off the flow of gases if the temperature in the combustion chamber exceeds a preset temperature. The temperature in the combustion chamber could exceed a preset temperature if gas has been ignited and dispensed for a period of time sufficient for the injection tube 34 to become hot.

The device tip 14 also includes a check valve 30. When activated, the check valve 30 prevents the propagation of flame from the combustion chamber or the device tip 14 into the gas line 18 or 20.

The device can be sized according to the requirements of the particular application, but one advantageous configuration is one in which the injection nozzle tube is made of non-ferrous metal and is a tube approximately 2 inches in diameter.

Sequentially, a valve controller 96 is activated by a controller valve activation switch 102. The valve controller 96 opens the oxygen valve 46 and the flammable gas valve 48, and gases flow toward the mixing tip 36. The gases are mixed in the mixing tip 36, which encloses the eductor 85. From the mixing tip 36 the gases flow through a check valve 30 which prevents backflow. From the check valve 30 the mixed gases enter the combustion chamber 66 through a turbo tip which disperses the mixed gases in multiple directions into the combustion chamber 66. From the combustion chamber, the gases flow through a nozzle tip 76 in which is located a vortex generator 32. The vortex generator 32 imparts a swirling motion to the gases by use of directional vanes 106. The directional vanes 106 impart a swirling motion into the mixture of gases coming from the combustion chamber 66 and exiting the nozzle tip 76. The swirling of the gases creates a vortex effect which extends not only out the device tip as the gases exit the device, but also extends into the combustion chamber and serves to draw the two gases towards the exit of the device tip and to mix them together when in the swirling vortex. The vortex generator 32, by creating a vortex in the gases, serves to mix the two gases together better and, since the vortex extends into the burrow, the two gases stay mixed together longer, and the stream of flammable gas and oxygen mixing together in a vortex extends for a greatly enhanced distance into the burrow. The vortex also serves to keep the two gases from separating as the distance from the device tip becomes greater. The nozzle tip 76 preferably includes a constricting flare 78, which is a section in the tubing of the nozzle tip 76 which has a narrowing internal diameter followed by a gradually expanding internal diameter. This constricting flare 78 in the passageway through which the mixture of gases flows is designed to impart a shockwave to the gas and oxygen as the gases are ignited.

Within the valve housing 12 is located a valve controller 96, an oxygen valve 36, and a gas valve 48. Within the valve housing 12 is also located a radio receiver 72 for receiving a signal from the remote transmitter 44. From the remote transmitter 44 a signal can be received to begin the flow of gases and a separate signal can be sent to activate the ignition of the gases. When the gases have flowed for a sufficient time, a signal to ignite is sent from the remote transmitter 44. The radio receiver sends that signal to the spark generator 68, which uses the battery 80 to generate a spark at the spark plug 24.

On the valve housing 12 is located a gas line connection 82 and an oxygen line connection 84. To these connections are attached an oxygen hose 62 and a gas hose 64 which connect the device to an oxygen source 58 and a gas source 60.

Figure 2:
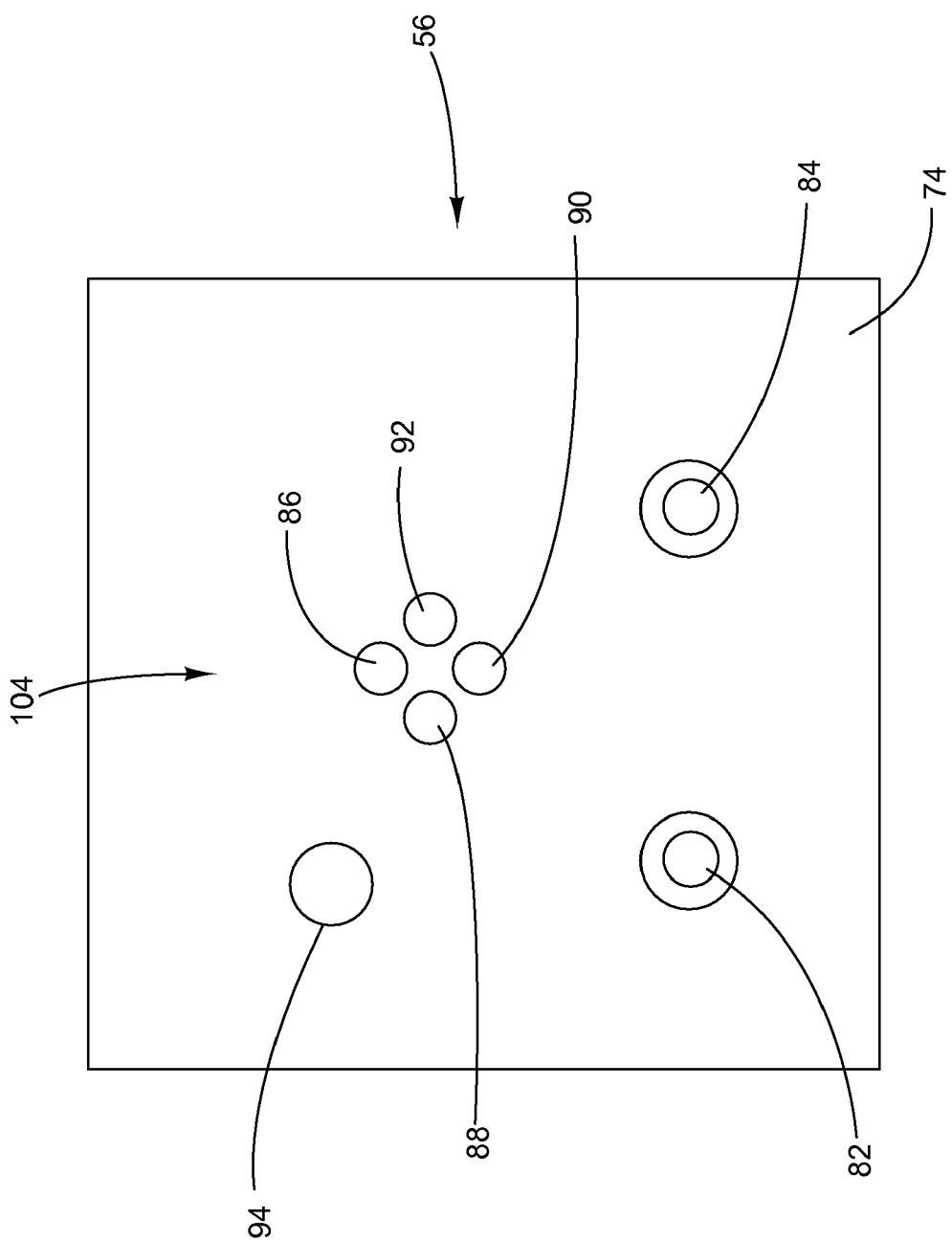
FIG. 2 is a view of the control panel of the invention.

FIG. 2 shows the configuration of the control panel assembly 56. The control panel assembly 56 includes a control panel 74, with a unit off/on switch 94 for turning the unit on or off. Also shown on the control panel 74 is a gas line connection 82 and an oxygen line connection 84 for manually attaching the gas and oxygen line. The control panel 74 can include a power indicator 86 in the form of a light, which would indicate if the power to the unit is activated or not. A flow indicator 88, battery indicator 90, and a spark indicator 92, may also be present and form a status board 104 as part of the control panel 74.

In the following description and in the figures, like elements are identified with like reference numerals. The use of "or" indicates a non-exclusive alternative without limitation unless otherwise noted. The use of "including" means "including, but not limited to," unless otherwise noted.

While there is shown and described the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A burrowing pest control device comprising:
   a radio receiver for receiving three distinct signals from a remote transmitter, comprising a first signal to open or close said oxygen control valve, a second signal to open or close said gas control valve, and a third signal to ignite said oxygen and flammable gas in a burrowing pest burrow;
   a valve assembly, comprising
      a hose connection for operative connection of said device to a source of oxygen
      a hose connection for operative connection of said device to a source of flammable gas
      an oxygen control valve for controlling a flow of oxygen to said device, with said oxygen control valve operatively connected to a radio receiver, and configured for remote electronic control so that an operator can control said oxygen control valve without direct contact with said oxygen control valve and while distant from said source of oxygen from a remote location;
      a gas control valve for controlling a flow of flammable gas to said device, with said gas control valve operatively connected to said radio receiver, and configured for remote electronic control so that an operator can control said flammable gas control valve without direct contact with said oxygen control valve and while distant from said source of flammable gas from a remote location;
      a valve controller for controlling said oxygen control valve and said gas control valve;
   a combustion assembly, comprising;
      a combustion chamber for creating a mixture of gas and oxygen;
      an oxygen conduit extending from said valve assembly to said combustion chamber;
      a flammable gas conduit extending from said valve assembly to said combustion chamber;
   an ignition assembly, comprising
      a spark plug for creating a spark in said combustion chamber;
      a spark generator for sending energy to said spark plug;
      an ignition switch for activating said spark generator;
      a valve controller activation switch;
   an injector assembly, comprising
      an injection tube, for conducting said mixture of gases to a burrow; and
   a control panel configured for remote operation of said oxygen and gas control valves and said ignition assembly via a remote transmitter, wherein said control panel is configured for remote electronic operation of said oxygen and gas control valves and said ignition assembly from a location remote from said oxygen and gas control valves and said ignition assembly and remote from the sources of oxygen and flammable gas, including a remote transmitter holding said ignition switch and a valve controller activation switches, with said remote transmitter configured to send three different signals, said first signal to open or close said oxygen control valve, said second signal to open or close said gas control valve, and said third signal to ignite said oxygen and flammable gas in a burrowing pest burrow;
   wherein said hose connections are configured for attachment to a source of oxygen and flammable gas, and in which said injector assembly is configured for insertion into a burrow in the ground, with said device being configured to activate delivery of a mixture of oxygen and flammable gas from a remote location, for injection into said burrow, and for remote activation of ignition by said ignition assembly.

2. The burrowing pest control device of claim 1 in which said combustion assembly further comprises a nozzle tip with an internal volume constricting flare, which is configured to impart a shock wave to the mixture of gas and oxygen as it leaves the device.

3. The burrowing pest control device of claim 2 which further comprises a mixing tip including an eductor in which a flow of oxygen draws one or more streams of flammable gas into said oxygen stream.

4. The burrowing pest control device of claim 3 which further includes a turbo tip operatively connected to said mixing tip with said turbo tip configured to mix said gases as said gases enter said combustion chamber.

5. The burrowing pest control device of claim 4 which includes directional vanes in a vortex generator to impart a vortex flow to said mix of gases as said gases exit said device.

6. The burrowing pest control device of claim 1 in which said valve assembly is housed in a valve housing, with the combustion, ignition, and injector assemblies in a device tip, with the valve housing and the device tip connected by conduits containing a gas line, an oxygen line, and an electronics line.

7. The burrowing pest control device of claim 6 in which the valve housing is held in a spaced apart relation from said device tip, joined together by an extended gas line, oxygen line, and an electronics line.

8. The burrowing pest control device of claim 1 in which said combustion assembly includes a thermal switch, for cutting off gas flow when the temperature of the combustion assembly exceeds a selected temperature.

9. The burrowing pest control device of claim 1 which further includes check valve in said combustion assembly for the purpose of preventing pre-ignition of gas.

10. The burrowing pest control device of claim 1 in which said control panel further includes a status board for display of device parameters.

11. The burrowing pest control device of claim 10 in which said status board is configured to display information about gas flow, power status, and spark.

12. The burrowing pest control device of claim 10 in which said information is displayed in the form of one or more lights to indicate device system status.

13. The burrowing pest control device of claim 6 in which mixing of gases occurs at a point adjacent to the device tip, and remote from said valve housing.

14. A burrowing pest control device comprising:
a radio receiver for receiving three separate signals from a remote transmitter, comprising a first signal to open or close an oxygen control valve, a second signal to open or close a gas control valve, and a third signal to ignite said oxygen and flammable gas in a burrow;
a valve assembly, comprising
   a hose connection for operative connection of said device to a source of oxygen
   a hose connection for operative connection of said device to a source of flammable gas
   an oxygen control valve for controlling a flow of oxygen to said device, with said oxygen control valve operatively connected to a radio receiver, and configured for remote electronic control so that an operator can control said oxygen control valve without direct contact with said oxygen control valve and while distant from said source of oxygen from a remote location;
   a gas control valve for controlling a flow of flammable gas to said device, with said gas control valve operatively connected to said radio receiver, and configured for remote electronic control so that an operator can control said flammable gas control valve without direct contact with said oxygen control valve and while distant from said source of flammable gas from a remote location;
   a valve controller for controlling said oxygen control valve and said gas control valve;
a combustion assembly, comprising;
   a combustion chamber for creating a mixture of gas and oxygen;
   an oxygen conduit extending from said valve assembly to said combustion chamber;
   a flammable gas conduit extending from said valve assembly to said combustion chamber;
an ignition assembly, comprising
   a spark plug for creating a spark in said combustion chamber;
   a spark generator for sending energy to said spark plug;
   an ignition switch for activating said spark generator;
   a valve controller activation switch;
an injector assembly, comprising
   an injection tube with a vortex tip for inducing a vortex swirling of the mixture of oxygen and flammable gas;
   a nozzle tip with an inner channel and an exit opening, with a constricting flare which constricts the flow of the mixture of oxygen and flammable gas adjacent to the exit opening with the nozzle tip inner channel expanding to a larger diameter between the flared section and the exit opening, for inducing a shock wave in the vortex of oxygen and flammable gas exiting the nozzle tip;
   a control panel configured for operation of said control valve and said ignition assembly via a remote transmitter, and a remote electronic transmitter with said ignition switch and a valve controller activation switch;
   wherein said hose connections are configured for attachment to a source of oxygen and flammable gas, and in which said injector assembly is configured for insertion into a burrow in the ground, with said device being configured to deliver a vortex mixture of oxygen and flammable gas for injection into said burrow, for ignition by said ignition assembly, with gas flow and ignition controlled from a remote location.

15. The burrowing pest control device of claim 14 which further comprises an oxygen control valve for control of oxygen flow, and a gas control valve for control of gas flow, with each configured for control from a remote location.

16. The burrowing pest control device of claim 14 which comprises a mixing tip in the form of an eductor in which a flow of oxygen draws one or more streams of flammable gas into said oxygen stream.

17. The burrowing pest control device of claim 16 which further includes a turbo tip operatively connected to said combustion chamber with said turbo tip configured to impart a vortex flow to said mix of gases as said gases exit said nozzle tip.

18. The burrowing pest control device of claim 17 in which said turbo tip comprises a plurality of directional vanes to impart a vortex flow to said mix of gases.

19. The burrowing pest control device of claim 14 in which said valve assembly is housed in a valve housing, with the combustion, ignition, and injector assemblies in a device tip, with the valve housing and the device tip connected by conduits containing a gas line, an oxygen line, and an electronics line.

20. The burrowing pest control device of claim 19 in which the valve housing is held in a spaced apart relation from said device tip, joined together by an extended gas line, oxygen line, and an electronics line.

21. The burrowing pest control device of claim 14 in which said combustion assembly includes a thermal switch, for cutting off gas flow when the temperature of the combustion assembly exceeds a selected temperature.

22. The burrowing pest control device of claim 14 which further includes check valve in said combustion assembly for the purpose of preventing ignition of gas.

23. The burrowing pest control device of claim 14 in which said control panel assembly further includes a status board for display of device parameters.

24. The burrowing pest control device of claim 23 in which said status board is configured to display information about gas flow, on status, and spark.

25. The burrowing pest control device of claim 24 in which said information is displayed in the form of one or more lights to indicate device system status.

26. The burrowing pest control device of claim 19 in which mixing of gases occurs at a point adjacent to the device tip, and remote from said valve housing.

* * * * *